Figure 1:
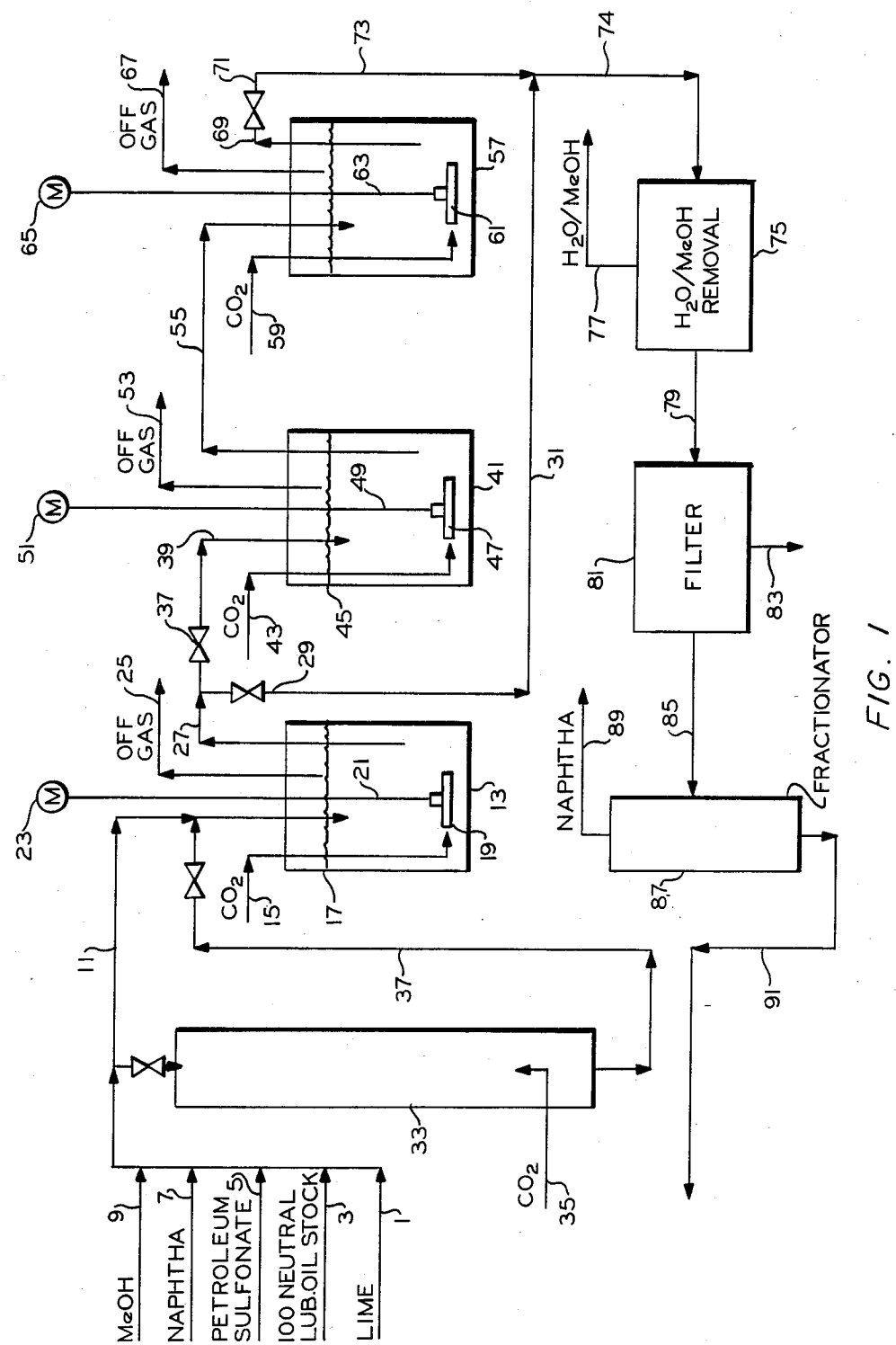

United States Patent [19]

Spence et al.

[11] Patent Number: 4,543,194
[45] Date of Patent: Sep. 24, 1985

[54] PRECARBONATION IN OVERBASING CALCIUM PETROLEUM SULFONATES

[75] Inventors: J. Ronald Spence; Douglas S. Jack, both of Bartlesville, Okla.

[73] Assignee: Phillips Petroleum Company, Bartlesville, Okla.

[21] Appl. No.: 594,641

[22] Filed: Mar. 28, 1984

[51] Int. Cl.$^4$ .............................................. C10M 1/40
[52] U.S. Cl. ......................................... 252/33; 252/18
[58] Field of Search .................................... 252/33, 18

[56] References Cited

U.S. PATENT DOCUMENTS

| | | | |
|---|---|---|---|
| 3,105,049 | 9/1963 | Voorhees | 252/33 |
| 3,155,616 | 11/1964 | Voorhees | 252/33 |
| 3,318,809 | 5/1967 | Bray | 252/33 |
| 3,488,722 | 1/1970 | Allphin, Jr. | 252/33 |
| 3,523,898 | 8/1970 | De Vault | 252/33 |
| 3,658,703 | 4/1972 | Gragson et al. | 252/33 |
| 4,086,170 | 4/1978 | De Clippelier et al. | 252/33 |
| 4,165,291 | 8/1979 | Gragson | 252/33 |
| 4,251,379 | 2/1981 | Le Coent et al. | 252/33 |

*Primary Examiner*—Jacqueline V. Howard
*Attorney, Agent, or Firm*—A. W. Umphlett

[57] ABSTRACT

Method and apparatus are provided for overbasing a petroleum sulfonate in a multi-vessel reaction system in which the first reactor is a plug flow reactor in which a feedstock of lime, lube oil, petroleum sulfonate, naphtha, and methanol is fed into the top of a vertical reactor with carbon dioxide in an amount of about 5 to about 10 percent by volume of the total $CO_2$ used in the process is fed near the bottom of the reactor above the reaction product outlet which is then passed to at least one continuous stirred tank reactor for additional reaction with carbon dioxide in an amount in a range of about 95 to about 90 percent by volume of the total $CO_2$ used in the process.

12 Claims, 1 Drawing Figure

PRECARBONATION IN OVERBASING CALCIUM PETROLEUM SULFONATES

BACKGROUND OF THE INVENTION

This invention relates to overbasing a calcium petroleum sulfonate. In another of its aspects this invention relates to the preparation of a lubricating oil additive. In still another of its aspects this invention relates to the production of calcium petroleum sulfonate having a high total base number (TBN) for use as an additive in lubricating oils, particularly crankcase oils for internal combustion engines to impart detergency and reduce sludge formation.

In one of its concepts this invention provides a process for overbasing a calcium petroleum sulfonate by manipulation of process steps or process conditions, particularly the addition of carbon dioxide, to provide a product having a TBN in desirable range.

Among the materials that impart detergency to lubricating oils thereby being of assistance in keeping internal engine parts clean and reducing sludge formation in the oil are overbased calcium petroleum sulfonates. These sulfonates are known to be useful as additives for lubricating oils, particularly crankcase oils for internal combustion engines.

It is known that equivalent detergency characteristics can be obtained with a lower concentration of additive in a lubricating oil —the higher the alkaline reserve of an additive: the larger the quantity of acidic combustion products accumulated in the oil to which the additive is added that can be neutralized by the additive. The measurement of alkaline reserve is reported as total base number (TBN) which is the number of milligrams of potassium hydroxide equivalent to the amount of acid required to neutralize the alkaline constituents present in one gram of sample. An additive having a total base number higher than can be obtained from calcium petroleum sulfonate alone is commonly said to be "overbased" or, alternatively, is said to be "superbasic".

Petroleum sulfonic acid which is neutralized to form petroleum sulfonates normally includes appreciable amounts of various hydrocarbons not having the acid group capable of forming the sulfonate so that the resulting product is a mixture of hydrocarbons and petroleum sulfonates. When the sulfonic acid is neutralized with an excess of CaO or $Ca(OH)_2$ to form the sulfonate, the resulting product has a relatively small alkaline reserve. The addition of a large excess of neutralizing material normally does not materially increase the alkaline reserve since the excess material is removed, usually by filtration, prior to the use of the sulfonate in a lubricant. The previously known processes for overbasing calcium petroleum sulfonates have experienced difficulty in obtaining sufficiently high alkaline reserves, e.g., TBN of 300 mg KOH/gm or higher, to enable the formulator to use lower amounts of additive while maintaining equivalent detergency or to protect the engine adequately under conditions of high acid formation in the combustion process.

It has now been found that the use of a precarbonating reactor having or approaching plug flow (very little forward or back mixing) allows the production of overbased calcium petroleum sulfonate having both an acceptable TBN and an acceptable turbidity under operating conditions in reaction systems that although otherwise similar but lacking the precarbonation system produced overbased petroleum sulfonate having marginal TBN and greater turbidity.

It is therefore an object of this invention to provide an overbased calcium petroleum sulfonate having high alkaline reserve and acceptable turbidity. It is another object of this invention to provide lubricating additive containing overbased calcium petroleum sulfonate having high alkaline reserve and acceptable turbidity. It is another object of the invention to provide a process for preparing an overbased calcium petroleum sulfonate having high alkaline reserve and acceptable turbidity. It is still another object of this invention to provide a process for preparing a lubricating additive containing overbased calcium petroleum sulfonate having a high alkaline reserve and acceptable turbidity.

Other aspects, concepts, and objects of this invention along with its several advantages will be apparent from a study of this disclosure and the appended claims.

STATEMENT OF THE INVENTION

According to this invention there is provided a method for overbasing a petroleum sulfonate in a multireaction system in which a feedstream comprising lime $(Ca(OH)_2)$, petroleum sulfonate, lubricating oil, methanol (MEOH), and naphtha is contacted in a plug flow reactor with carbon dioxide $(CO_2)$ with the carbon dioxide in an amount in a range of about 5 to about 10 percent by volume of the total $CO_2$ used in the process thereby producing a first treated product which thereafter is further contacted in at least one continuous stirred tank reactor with carbon dioxide in an amount in a range of about 95 to about 90 percent by volume of the total $CO_2$ used in the process. In an embodiment of this invention overbased calcium petroleum sulfonate is provided as a product of the process described above.

In further embodiments of the invention the first treated product is further contacted with carbon dioxide in a series of continuous stirred tank reactors with the effluent from each continuous stirred tank reactor being fed seriatim to the subsequent continuous stirred tank reactor as feedstock. In a preferred embodiment of the invention as series of three continuous stirred tank reactors is used for further contacting.

In another embodiment of this invention apparatus is provided for overbasing a petroleum sulfonate in a multi-reaction vessel system in which a vertical plug flow reactor to which inlet means for introducing a downflow of a feedstock comprising lime, neutral petroleum sulfonate, lubricating oil, methanol, and naphtha enters the top portion of the reactor and means for introducing carbon dioxide countercurrent flow enters the bottom portion of the reactor above outlet means from the reactor which transfers effluent reaction product to at least one continuous stirred reactor having continuous agitation means, means for inlet of additional $CO_2$, means for removing off gas from a vapor space and means for removing reaction product. In preferred embodiments of the invention a multiplicity of continuous stirred reactors each like the one just described are connected in series.

This invention provides a continuous process for producing a detergent-dispersive additive for motor oils by reacting carbon dioxide $(CO_2)$ with line $Ca(OH)_2$ in the presence of methanol and simultaneously dispersing the resultant calcium carbonate $(CaCO_3)$ in a 50/50 mixture of calcium petroleum sulfonate and No. 10 stock lubricating oil, i.e., a finishd 100 neutral lube stock (100 SUS at 100° F.). The reaction is carried out in naphtha solvent. The product is then stripped of water and methanol, filtered to remove the solids and stripped of naphtha. The finished product is a colloidal dispersion of $CaCO_3$ in a range of about 20 to about 40 weight percent usually about 27 weight percent in the 50/50 calcium petroleum sulfonate/100 neutral stock mixture.

The petroleum sulfonates useful in the present invention can be described as neutral petroleum sulfonate prepared by sulfonating KC250 bright stock having viscosity of 200 SUS at 210° F. (See U.S. Pat. NO. 3,135,693 incorporated hereby reference).

The neutral lube oil useful in this invention can be described as solvent refined 100 neutral lube oil stock having viscosity of 100 SUS at 100° F.

The lime, calcium hydroxide, useful in the present invention can have a surface area of about 5 to about 50 $M^2/g$. The lime is not soluble in the reaction mixture and is of sufficient density to tend to settle rapidly. A preferred hydrated lime or slaked lime $Ca(OH)_2$, is Kemilime manufactured by Ash Grove Cement Co., Kansas City, MO.

The methanol (MeOH) useful in this invention as a promoter/solvent is described as methanol having 0 to about 10 weight percent $H_2O$.

The naphtha used in this invention is described as petroleum naptha having boiling point range of about 80 to about 300° C.

The $CO_2$ useful in this invention is described as technical grade or chemically pure $CO_2$.

General reaction conditions to make overbased product having 300 total base number (defined as Mg. KOH equivalent/gram product) are as follows: The temperature for the carbonation reaction can range from 25° C. (77° F.) to 80° C. (176° F.), preferably 35° C, (95° F.) to 65° C. (149° F.). Pressure of the carbonation reaction can range from 1 psia to 30 psia, preferably 10 to 20 psia. The overbasing (carbonation) residence or reaction time can vary from 20 minutes to 120 minutes, preferably 50 to 70 minutes overall.

Feed component concentrations for the carbonation reaction are as follows:

| Component | Weight % of Total Feed | |
|---|---|---|
| | In General | Preferred |
| Carbon Dioxide ($CO_2$) | 2.0 to 10 | 4 to 7 |
| Hydrated Lime ($Ca(OH)_2$) | 5.0 to 20 | 10 to 15 |
| Neutral Oil (Calcium (Petroleum Sulfonate) | 5.0 to 15 | 7 to 12 |
| No. 10 Lubricating Oil Stock | 5.0 to 15 | 7 to 12 |
| Naphtha | 30.0 to 80.0 | 50 to 70 |
| Methanol | 2.0 to 10.0 | 3 to 7 |

The $CO_2$ is added as a vapor, lime as a solid and the rest of the components as liquids. In addition up to 1.0 weight percent water can be added in the feed and still achieve 300 total base number. Initial water concentrations greater than 1.0 percent, however, can be detrimental by reducing the base number of the product.

The invention is best described in conjunction with the drawing which is a schematic representation of a three reactor system followed by a purification system.

This invention can best be described inconjunction with the drawing which is a schematic drawing of a process for overbasing petroleum sulfonate using a precarbonation column and at least one continuous stirred tank reactor followed by recovery of product.

Referring now to the drawing, a process over which the invention is an improvement will be exemplified.

740 grams KemiLime through line (1), 738 grams of 100 neutral stock oil through line (3), 2,360 grams 31.3 percent petroleum sulfonate through line (5), 7,000 grams naphtha through line (7), and 452 grams methanol through line (9) were conbined in line (11) and fed to continuous stirred reactor (13). Carbon dioxide was fed through line (15) beneath the liquid level (17) and near the blade (19) connected by rod (21) the motor drive (23) which provides the continuous agitation in reactor (13). The liquid feedstock mixture remained in the reactor for 20 minute residence time which approximates a feed rate of about 34 grams/minute. Reaction temperature was 44.5° C. Off-gas was removed about the liquid level through line (25) and a product was collected through line (27), valve (29) and line (31) to be passed into a product recovery system. Samples of the reactor product tabulated in Table I below show that a product of unacceptable total base number was produced that became hazy upon increased operation time.

TABLE I

| Time (hrs.) | 1 | 3.0 | 5.0 |
|---|---|---|---|
| Total Base Number | 184 | 211 | 191 |
| Hazy/Clear | Clear | Hazy | Hazy |

In a test run according to the process of this invention the same feedstock described above was fed through line (11) into precarbonation reactor (33) which here is a one-half inch I.D. by 36 inch long downflow pipe reactor. Carbon dioxide was fed through line (35) at a rate of 0.029 L/min. into the precarbonation reactor (33) to produce a first treated product which was passed through line (37) into continuous stirred tank reactor (13).

In continuous stirred tank reactor (13) additional carbon dioxide was fed through line (15) at a rate of 0.263 L/min. at a point near the agitator blade (19) and product was conducted from the continuous stirred tank reactor through line (27), valve (29) and line (31) for recovery.

The reaction temperature and liquid reactant feed rate through the continuous stirred reactor was maintained as nearly as possible to be the same both in the reactions with and without the precarbonation column. Table II below shows that even though the product produced with precarbonation column and one continuous stirred reactor was of low TBN level that the turbidity problem was relieved.

TABLE II

| Time (hrs.) | 1.0 | 3.0 | 5.0 |
|---|---|---|---|
| TBN | 192 | 208 | 209 |
| Hazy/Clear | Clear | Clear | Clear |

In a further reaction initially run for 4 hours not according to the method of this invention then subsequently run for 4 hours according to the method of this invention 1,081 grams KemiLime through line (1), 773.8 grams 100 neutral lubricating stock oil through line (3), 2,264 grams of 20.04 percent petroleum sulfonate through line (5), 6,696 grams naphtha through line (7), and 481 grams methanol through line (9) were combined to be fed through line (11) into a first continuous stirred tank reactor (13). Carbon dioxide was fed into the first reactor through line (15) at a rate that will be described below. The first continuous stirred reactor (13) is agitated by an agitator blade (19) attached by shaft (21) to agitator motor (23) to provide continuous agitation. Off-gas was removed above the liquid level through line (25). The first treated product, effluent from reactor (13) was passed through line (27), valve (37) and line (39) into a second continuous stirred tank reactor (41). Carbon dioxide was fed at a rate that will be described later through line (43) into the area below the liquid level (45) of reactor (41) and the tank was continuous agitated by agitator blade (47) connected by shaft (49) to motor (51). Off-gas was removed above the liquid level through line (53). A second treated product, effluent from tank (41), was removed through line (55) into third continuous stirred reactor (57). Carbon dioxide was fed through line (59) at a rate described below into the reactor which was agitated by agitator blade (61) attached by shaft (63) to agitator motor (65). Off-gas was removed through line (67) and a third treated, product, the product of the process, was removed through line (69), valve (71) and line (73) for recovery processes.

For recovery, effluent from the last reactor is passed through line (74) into a dryer system (75) maintained at a temperature in a range of about 180 to about 220° F. in which water and methanol are removed through line (77). The dried liquid is then passed through line (79) to a filtering means, preferably a commercial rotary filter (81), from which solids are removed through line (83). The filtered liquid is passed through line (85) to a vacuum fractionator (87) in which the naphtha is removed as overhead through line (89) and the overbased petroleum sulfonate/100 neutral stock mixture is removed as product through line (91).

Table III below sets forth the conditions of carbon dioxide distribution and reaction temperature for the initial 4 hours of the run in the three continuous stirred tank reactors to which the total flow of carbon dioxide was in a ratio of mole carbon dioxide/mole calcium hydroxide of about 0.70.

TABLE III

| CSTR No. | 1 | 2 | 3 |
|---|---|---|---|
| $CO_2$ distribution: wt. % | 19.7 | 54 | 26.3 |
| Temp. °C.: | 42.4 | 45.5 | 42.2 |
| Total mole/mole $CO_2$:$Ca(OH)_2$ | 0.70 | | |

Thus according to the process of the present invention the final 3½ hours of the same test run was made in which the feedstock described above for the three continuous stirred reactors was passed through line (11) and into precarbonation column (33) which is the same pipe reactor as described above. Carbon dioxide at a rate that will be described below was passed through line (35) into the pipe reactor and the effluent was passed through line (37) into the first continuous stirred tank reactor (13). Carbon dioxide was passed into each of the three continuous stirred reactors (13), (41), (57) through lines (15), (43), (59) and effluent was passed from each of the reactors seriatim into the next with collection of product of the process through line (69), valve (71) and line (73).

Table IV below sets forth the distribution of the carbon dioxide and the reaction temperature in the precarbonator and each of the continuous stirred tank reactors (CSTR) with the total flow of carbon dioxide at a rate of moles carbon dioxide/moles calcium hydroxide of about 0.70 mole/mole.

TABLE IV

| Reactor | Precarbonator | CSTR 1 | CSTR 2 | CSTR 3 |
|---|---|---|---|---|
| $CO_2$ distribution wt. % | 7.2 | 35.0 | 40.8 | 17.0 |
| Temp. °C. | 47.5 | 42.5 | 45.5 | 42.2 |

Table V describes an overbasing run in which for the first three hours product was produced using three conventional CSTR's in series. At approximately 3.5 hours, the operation of the reactor train was changed. A small volume precarbonation reactor was placed into operation upstream of the 3 CSTR's. The $CO_2$ distribution, and reactor temperatures for the first 3 hours is shown in Table III, and the $CO_2$ distribution and reactor temperatures for the remaining 3.5 hours of run with the precarbonation reactor are shown in Table IV. Note that although the TBN was acceptable for the first three hours, the turbidity was increasing with time (unacceptable). When the precarbonation reactor was placed in operation the TBN of the product increased while the turbidity decreased. This is an obvious improvement. The product produced without the precarbonation reactor became unacceptable after three hours of operation. While the product produced with the precarbonation reactor in operation improved with time.

TABLE V

| Hours | No Precarbonation | | | | Precarbonation | | |
|---|---|---|---|---|---|---|---|
| | 1 | 2 | 3 | 4 | 5 | 6 | 7.5 |
| Total Base Number | 318 | 323 | 318 | 321 | 343 | 341 | 331 |
| Turbidity* | 33 | 53 | 75 | 73 | 63 | 53 | 45 |

*Turbidity greater than 70 is visible to the eye and is not acceptable.

We claim:

1. A method for overbasing a petroleum sulfonate in a multi-reaction system comprising:
    (1) contacting a feedstream comprising $Ca(OH)_2$, neutral petroleum sulfonate, lubricating oil, methanol, and naphtha under reaction conditions of carbonation reaction temperature in a range of about 25° C. to about 80° C., and a carbonation reaction pressure in a range of about 1 psia to about 30 psia, in a plug flow reactor with carbon dioxide, said carbon dioxide present in an amount of a range of about 5 to about 10 percent by volume of the total $CO_2$ used in the process thereby producing a first treated product,
    (2) contacting said first treated product in at least one continuous stirred tank reactor with additional carbon dioxide under reaction conditions of carbonation reaction temperature in a range of about 25° C. to about 80° C., and a carbonation reaction pressure in a range of about 1 psia to about 30 psia, in an amount in a range of about 95 to about 90 percent by volume of the total $CO_2$ used in the process with the total reaction time for steps (1) and (2) in a range of about 20 minutes to about 120 minutes.

2. A method of claim 1 wherein said first treated product is further contacted with carbon dioxide in a series of continuous stirred tank reactors wherein the effluent from each preceding continuous stirred tank reactor is the feedstock for the next subsequent continuous stirred tank reactor and the 95 to about 90 percent by volume of the total $CO_2$ fed to the continuous stirred tank reactors is proportioned between the reactors.

3. A method of claim 2 wherein there is a series of three continuous stirred tank reactors with about 35 weight percent of the total CO₂ distributed to the first continuous stirred reactor in the series, about 41 weight percent of the total CO₂ distributed to the second continuous stirred tank reactor in the series, and about 17 weight percent of the total CO₂ distributed to the third continuous stirred tank reactor in the series.

4. A method of claim 1 wherein in weight percent of the total feed CO₂ is present in a range of about 2 to about 10, Ca(OH)₂ is present in a range of about 5 to about 20, neutral petroleum sulfonate is present in a range of about 5 to about 15, lubricating oil is present in a range of about 5 to about 15, methanol is present in a range of about 2 to about 10, and naphtha is present in a range of about 30 to about 80.

5. A method of claim 2 wherein in weight percent of the total feed CO₂ is present in a range of about 2 to about 10, Ca(OH)₂ is present in a range of about 5 to about 20, neutral petroleum sulfonate is present in a range of about 5 to about 15, lubricating oil is present in a range of about 5 to about 15, methanol is present in a range of about 2 to about 10, and naphtha is present in a range of about 30 to about 80.

6. A method of claim 3 wherein in weight percent of the total feed CO₂ is present in a range of about 2 to about 10, Ca(OH)₂ is present in a range of about 5 to about 20, neutral petroleum sulfonate is present in a range of about 5 to about 15, lubricating oil is present in a range of about 5 to about 15, methanol is present in a range of about 2 to about 10, and naphtha is present in a range of about 30 to about 80.

7. A method of claim 1 wherein said carbonation reaction temperature is in a range of about 35° C. to about 65° C. and said carbonation reaction pressure is in a range of about 10 psia to about 20 psia in both the plug flow reactor and the continuous stirred tank reactors and total process time for steps (1) and (2) is in a range of about 50 to about 70 minutes.

8. A method of claim 2 wherein said carbonation reaction temperature is in a range of about 35° C. to about 65° C. and said carbonation reaction pressure is in a range of about 10 psia to about 20 psia in both the plug flow reactor and the continuous stirred tank reactors and total process time for steps (1) and (2) is in a range of about 50 to about 70 minutes.

9. A method of claim 3 wherein said carbonation reaction temperature is in a range of about 35° C. to about 65° C. and said carbonation reaction pressure is in a range of about 10 psia to about 20 psia in both the plug flow reactor and the continuous stirred tank reactors and total process time for steps (1) and (2) is in a range of about 50 to about 70 minutes.

10. A method of claim 1 wherein in weight percent of the total feed CO₂ is present in a range of about 4 to about 7, Ca(OH)₂ is present in a range of about 10 to about 15, neutral petroleum sulfonate is present in a range of about 7 to about 12, lubricating oil is present in a range of about 7 to about 12, methanol is present in a range of about 3 to about 7, and naphtha is present in a range of about 50 to about 70.

11. A method of claim 2 wherein in weight percent of the total feed CO₂ is present in a range of about 4 to about 7, Ca(OH)₂ is present in a range of about 10 to about 15, neutral petroleum sulfonate is present in a range of about 7 to about 12, lubricating oil is present in a range of about 7 to about 12, methanol is present in a range of about 3 to about 7, and naphtha is present in a range of about 70.

12. A method of claim 3 wherein in weight percent of the total feed CO₂ is present in a range of about 4 to about 7, Ca(OH)₂ is present in a range of about 10 to about 15, neutral petroleum sulfonate is present in a range of about 7 to about 12, lubricating oil is present in a range of about 7 to about 12, methanol is present in a range of about 3 to about 7, and naphtha is present in a range of about 50 to about 70.

* * * * *